(12) United States Patent
Chang et al.

(10) Patent No.: US 12,246,774 B2
(45) Date of Patent: Mar. 11, 2025

(54) VEHICLE SIDE BODY STRUCTURE

(71) Applicants: HYUNDAI MOTOR COMPANY, Seoul (KR); KIA CORPORATION, Seoul (KR)

(72) Inventors: Ji Won Chang, Seoul (KR); Daemyoung Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 290 days.

(21) Appl. No.: 17/950,889

(22) Filed: Sep. 22, 2022

(65) Prior Publication Data

US 2023/0382459 A1 Nov. 30, 2023

(30) Foreign Application Priority Data

May 31, 2022 (KR) .................. 10-2022-0067212

(51) Int. Cl.
*B62D 25/02* (2006.01)
*B62D 21/15* (2006.01)
*B62D 27/02* (2006.01)

(52) U.S. Cl.
CPC ......... *B62D 25/025* (2013.01); *B62D 21/157* (2013.01); *B62D 27/023* (2013.01); *B60Y 2306/01* (2013.01)

(58) Field of Classification Search
CPC .... B62D 25/025; B62D 25/04; B62D 21/157; B62D 27/02; B62D 27/023; B60Y 2306/01

USPC ................... 296/209, 29, 30, 193.06, 187.12
See application file for complete search history.

(56) References Cited

U.S. PATENT DOCUMENTS 8,366,183 B2 * 2/2013 Ishigame ............... B62D 25/04
  296/193.06
9,809,258 B2 * 11/2017 Emura ................... B62D 25/04
11,161,551 B2 * 11/2021 Honko ................. B62D 25/025

FOREIGN PATENT DOCUMENTS

CN 106143634 A * 11/2016 ............. B62D 25/04
DE 19647104 A1 * 5/1998 ........... B62D 25/025

OTHER PUBLICATIONS

CN106143634 Text (Year: 2016).*
DE19647104 Text (Year: 1998).*

* cited by examiner

*Primary Examiner* — Dennis H Pedder
(74) *Attorney, Agent, or Firm* — Lempia Summerfield Katz LLC

(57) ABSTRACT

A vehicle side body structure including: i) a side sill disposed along a front-rear direction of a vehicle body; and ii) a separate sill parting member coupled to a upper portion of the side sill. The sill parting member may include a protrusion portion extending upward from an upper surface of the side sill and along the front-rear direction of the vehicle body.

9 Claims, 10 Drawing Sheets

VEHICLE SIDE BODY STRUCTURE

CROSS-REFERENCE TO RELATED APPLICATION

This application claims priority to and the benefit of Korean Patent Application No. 10-2022-0067212 filed in the Korean Intellectual Property Office on May 31, 2022, the entire contents of which are incorporated herein by reference.

BACKGROUND

(a) Technical Field

An embodiment of the present disclosure relates to a body of a vehicle, and more particularly, to a vehicle side body structure having improved side collision performance.

(b) Description of the Related Art

Generally, a vehicle body includes a side structure and a roof structure coupled to an upper portion of the side structure. Among the side structure and the roof structure, the side structure includes a plurality of pillars connected to a side sill along a vertical direction to protect passengers while supporting the overall rigidity of the vehicle body in the event of a side collision of a vehicle.

In the event of a side collision of a vehicle, when a side structure fails to secure rigidity and strength, a collision load is concentrated on the side sill, and rotation occurs due to the moment of the side sill, thereby increasing the possibility of injury to the passenger.

The Insurance Institute for Highway Safety (IIHS) comprehensively evaluates the collision safety performance and collision prevention performance of vehicles. Recently, IIHS has applied more stringent safety rating standards for side collision evaluation. For this purpose, IIHS is increasing evaluation conditions such as a speed and weight of a barrier for a crash test.

Therefore, securing the rigidity and strength of the vehicle side body is inevitably required to minimize deformation of the side of the vehicle body, secure passenger safety performance, and respond to the IIHS side collision evaluation.

The above information disclosed in this Background section is only to enhance understanding of the background of the disclosure. Therefore, the Background section may contain information that does not form the prior art that is already known in this country to a person of ordinary skill in the art.

SUMMARY

Embodiments of the present disclosure provide a vehicle side body structure that may respond to more strengthened Insurance Institute for Highway Safety (IIHS) side collision evaluation (e.g., standards) while minimizing deformation of a vehicle body and securing passenger safety performance, due to a side collision of a vehicle.

An embodiment of the present disclosure provides a vehicle side body structure, including: i) a side sill disposed along a front-rear direction of a vehicle body; and ii) a separate sill parting member coupled to an upper portion of the side sill. The sill parting member may include a protrusion portion extending upward on a reference line in the front-rear direction of the vehicle body along an upper surface of the side sill (i.e., extending upward from an upper surface of the side sill and along the front-rear direction of the vehicle body).

The sill parting member may be coupled to a lower portion of a center pillar disposed in a vertical direction.

A height of the protrusion portion may be set to overlap a striking portion of a barrier for side collision evaluation.

The sill parting member may be coupled to a section portion that is notched on an upper portion of the side sill.

The side sill may include a sill inner member and a sill outer member bonded to each other.

The sill parting member may be coupled to an upper portion of the sill outer member, and may be coupled to a lower portion of a pillar outer member of a center pillar.

The sill parting member may include flat portions that respectively extend from both sides of the protrusion portion along the front-rear direction of the vehicle body and are bonded to a lower surface of the side sill.

The sill parting member may include a first flange portion extending upwardly from one edge along a vehicle width direction, and a second flange portion extending downwardly from another edge.

The first flange portion may include a first bonding portion bonded to an upper portion of the side sill and a second bonding portion bonded to a lower portion of the center pillar.

The second flange portion may be bonded to an inner surface of the side sill.

The protrusion portion may be bonded to a pillar reinforcing member coupled to an inner surface of the center pillar.

According to the embodiments of the present disclosure, since rotation of a side sill may be prevented in the event of a side collision of a vehicle, it is possible to respond to a more strengthened IIHS side collision evaluation while securing collision safety performance by minimizing deformation of a vehicle body and securing a space for passengers to survive.

In addition, effects that may be obtained or expected from embodiments of the present disclosure are directly or suggestively described in the following detailed description. In other words, various effects expected from embodiments of the present disclosure are described in the following detailed description.

BRIEF DESCRIPTION OF THE DRAWINGS

These drawings are for reference only in describing embodiments of the present disclosure. Therefore, the technical idea of the present disclosure should not be limited to the accompanying drawings.

It should be understood that the above-referenced drawings are not necessarily drawn to scale, presenting a somewhat simplified representation of various features illustrative of the basic principles of the disclosure. The specific design features of the present disclosure, including, for example, specific dimensions, orientations, locations, and shapes, are determined in part by the particular intended application and use environment.

DETAILED DESCRIPTION OF THE EMBODIMENTS

The present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another by welding, self-piercing rivets (SPR), flow drill screws (FDS), a structural adhesive, and the like or indirectly connected via one or more intermediary components.

It is understood that the term "vehicle," "vehicular," "car," or other similar terms as used herein is inclusive of motor vehicles, in general. Such motor vehicles may encompass passenger automobiles including sports utility vehicles (SUV), buses, trucks, various commercial vehicles, watercraft including a variety of boats and ships, aircraft, and the like. Such motor vehicles may also include hybrid vehicles, electric vehicles, hybrid electric vehicles, electric vehicle-based purpose-built vehicles (PBV) vehicles, hydrogen-powered vehicles, and other alternative fuel vehicles (e.g., fuels derived from resources other than petroleum).

Hereinafter, embodiments of the present disclosure are described in detail with reference to the accompanying drawings.

Figure 1:
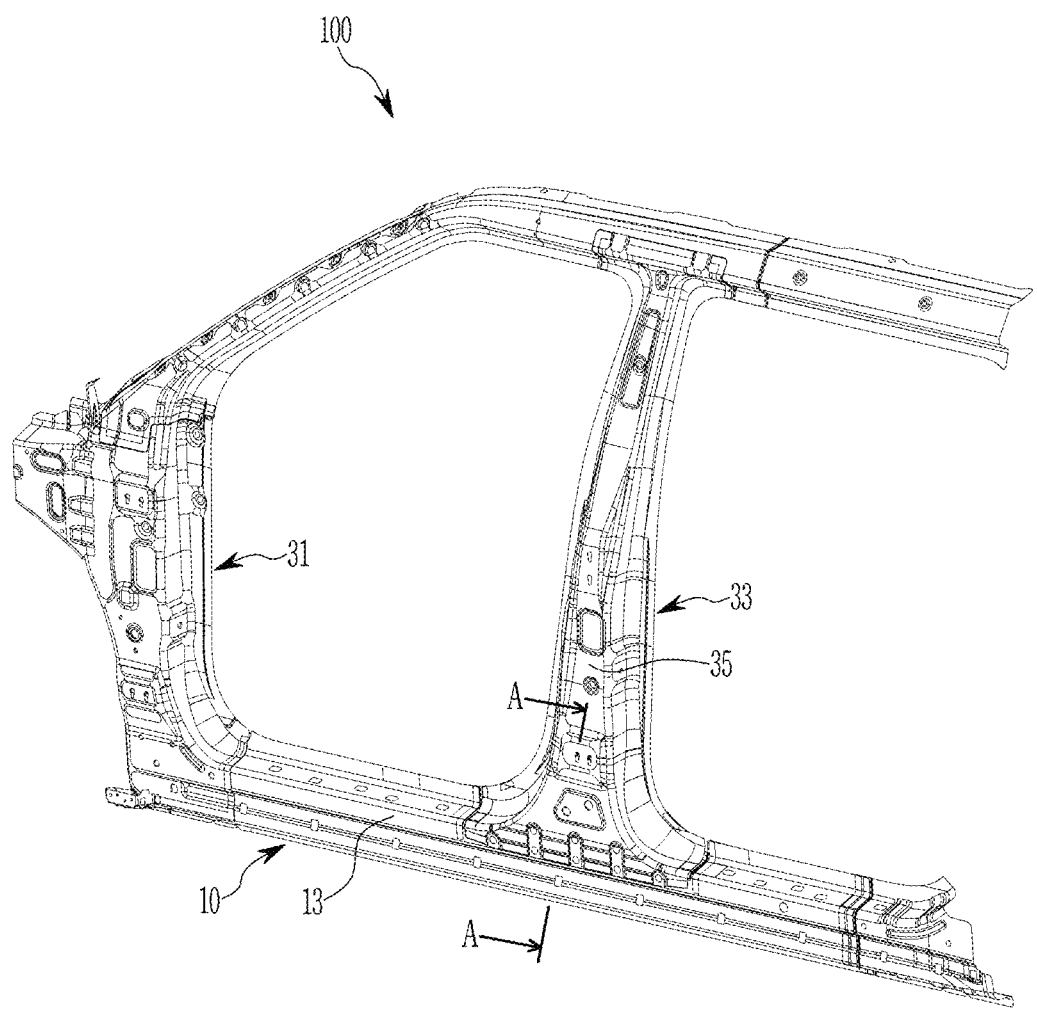
FIGS. 1-4 illustrate combined perspective views of a vehicle side body structure according to an embodiment of the present disclosure.
Figure 2:
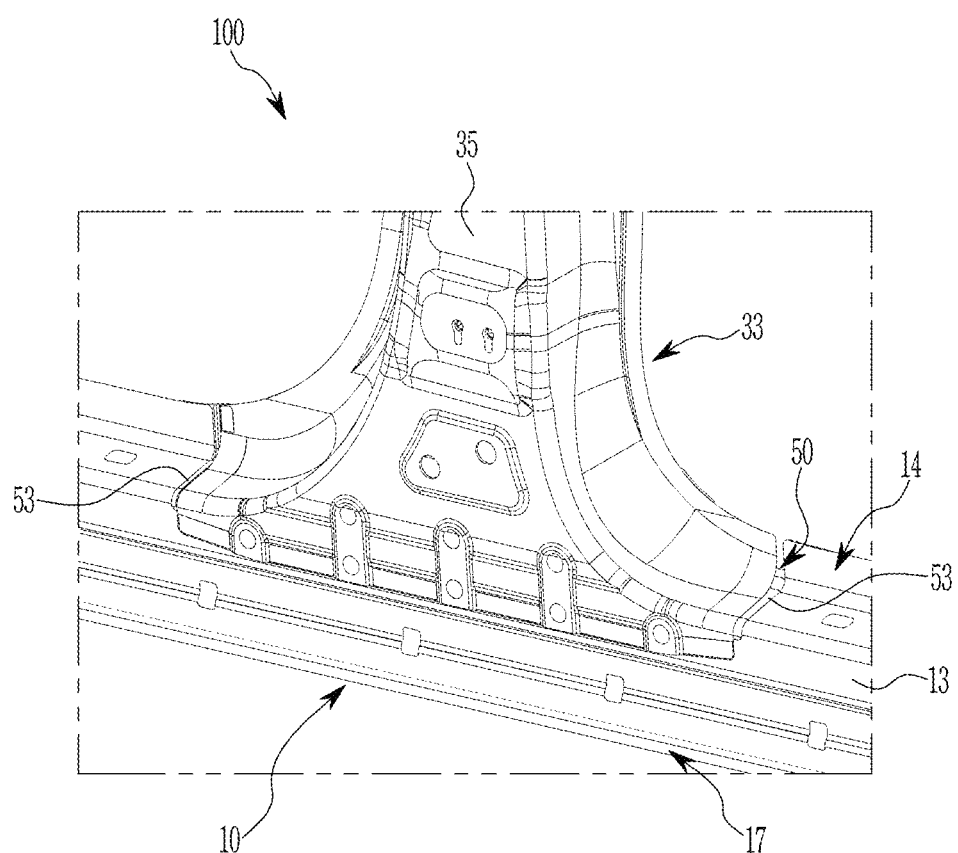
Figure 3:
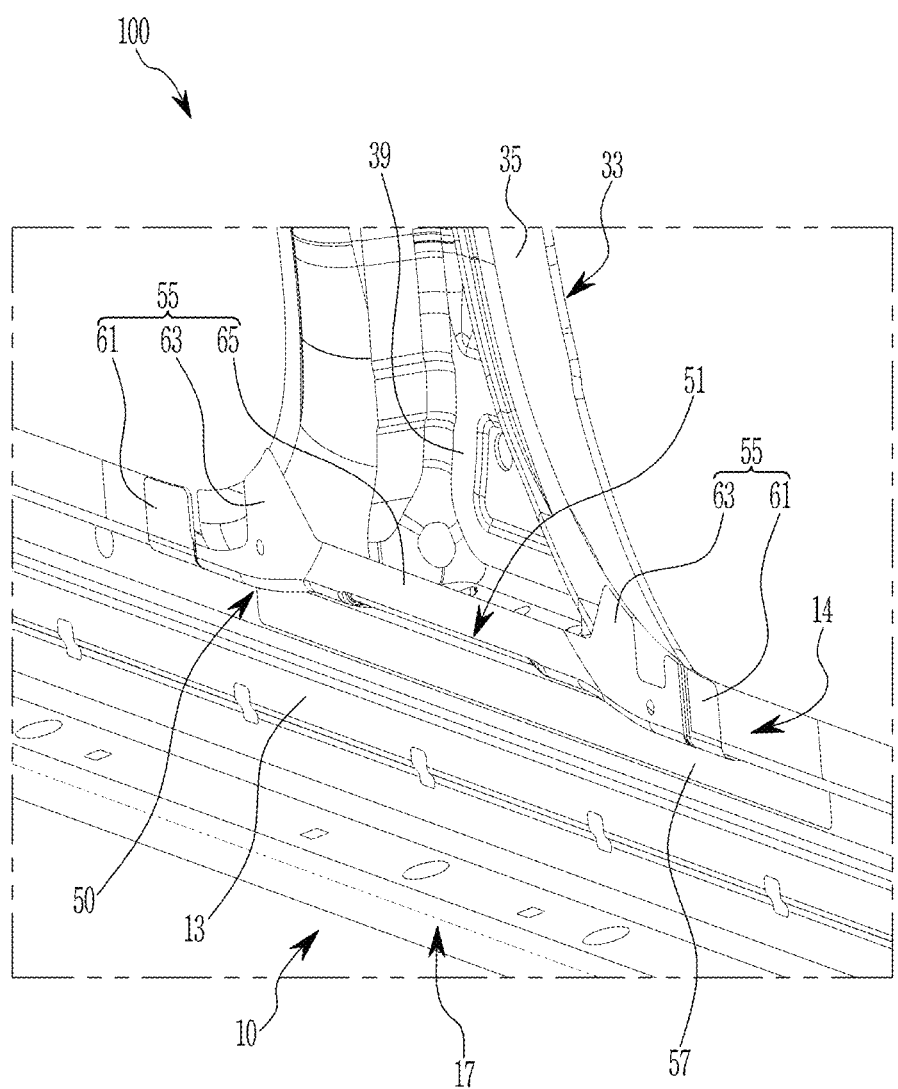
Figure 4:
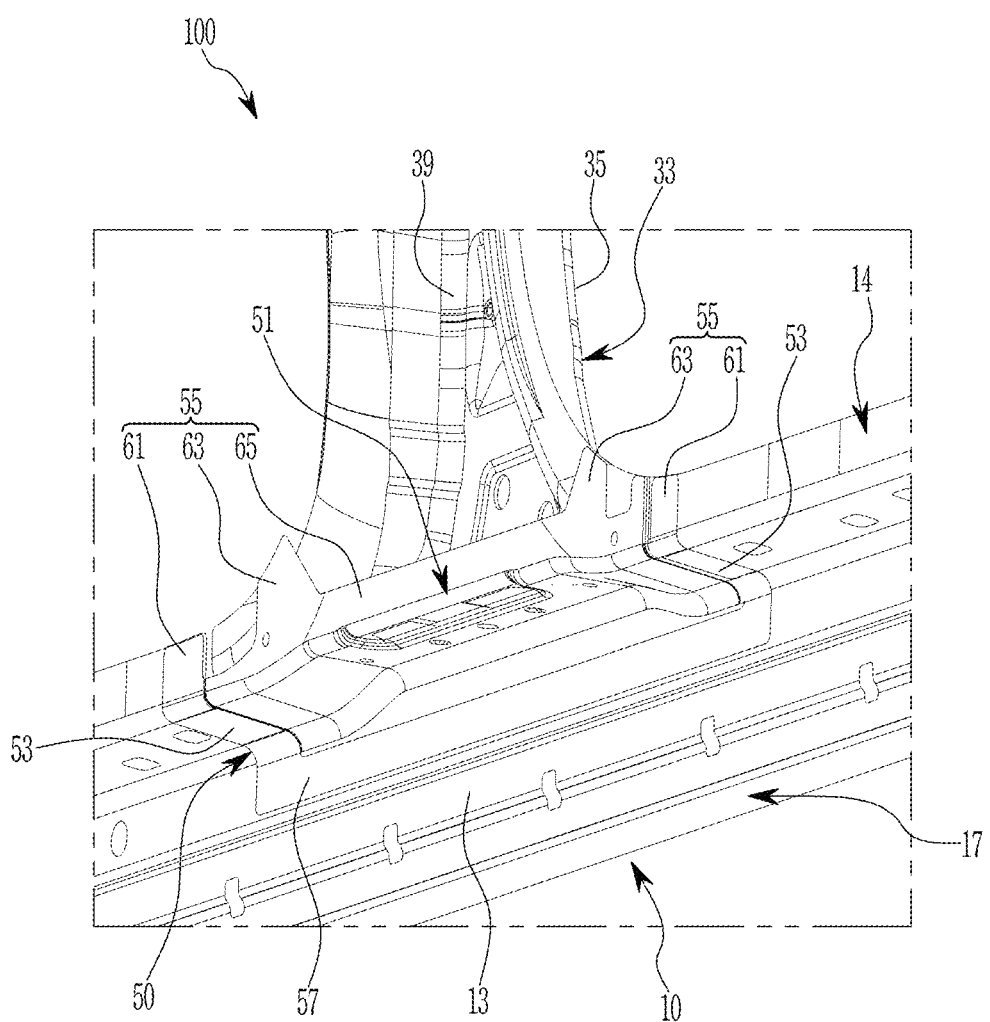

FIGS. 1-4 illustrate combined perspective views of a vehicle side body structure according to an embodiment of the present disclosure. FIG. 3 and FIG. 4 illustrate, for convenience of explanation, a vehicle side body structure with respect to a sill outer member of a side sill.

Referring to FIGS. 1-4, a vehicle side body structure 100, according to an embodiment of the present disclosure, may be applied to vehicle bodies of various vehicle models.

Reference directions for describing the following constituent elements may be set in a vehicle body front-rear direction (e.g., a vehicle body length direction or longitudinal direction), a vehicle width direction (e.g., a lateral direction), and a vertical direction (e.g., a height direction) based on the vehicle body.

The vehicle side body structure 100, according to an embodiment of the present disclosure, is provided at both sides of the vehicle body along the vehicle width direction, respectively, and may be combined to a roof structure body (not shown).

In the present specification, an 'upper end portion,' 'upper portion,' 'upper end,' or 'upper surface' of a constituent element represents an end portion, portion, end, or surface of the constituent element that is relatively upper in the drawing. A 'lower end portion,' 'lower portion,' 'lower end,' or 'lower surface' of a constituent element represents an end portion, portion, end, or surface of the constituent element that is relatively lower in the drawing.

In addition, in the present specification, an end of a constituent element (e.g., one end, the other end, both ends, or the like) represents an end of the constituent element in any one direction. Further, an end portion of a constituent element (e.g., one end portion, the other end portion, both end portions, a front end portion, a rear end portion, or the like) represents a portion of the constituent element including the end.

The vehicle side body structure 100, according to an embodiment of the present disclosure, is configured of a structure that may respond to a more strengthened Insurance Institute for Highway Safety (IIHS) side collision evaluation due to a side collision of a vehicle, while minimizing deformation of the vehicle body and securing passenger safety performance.

Figure 5:
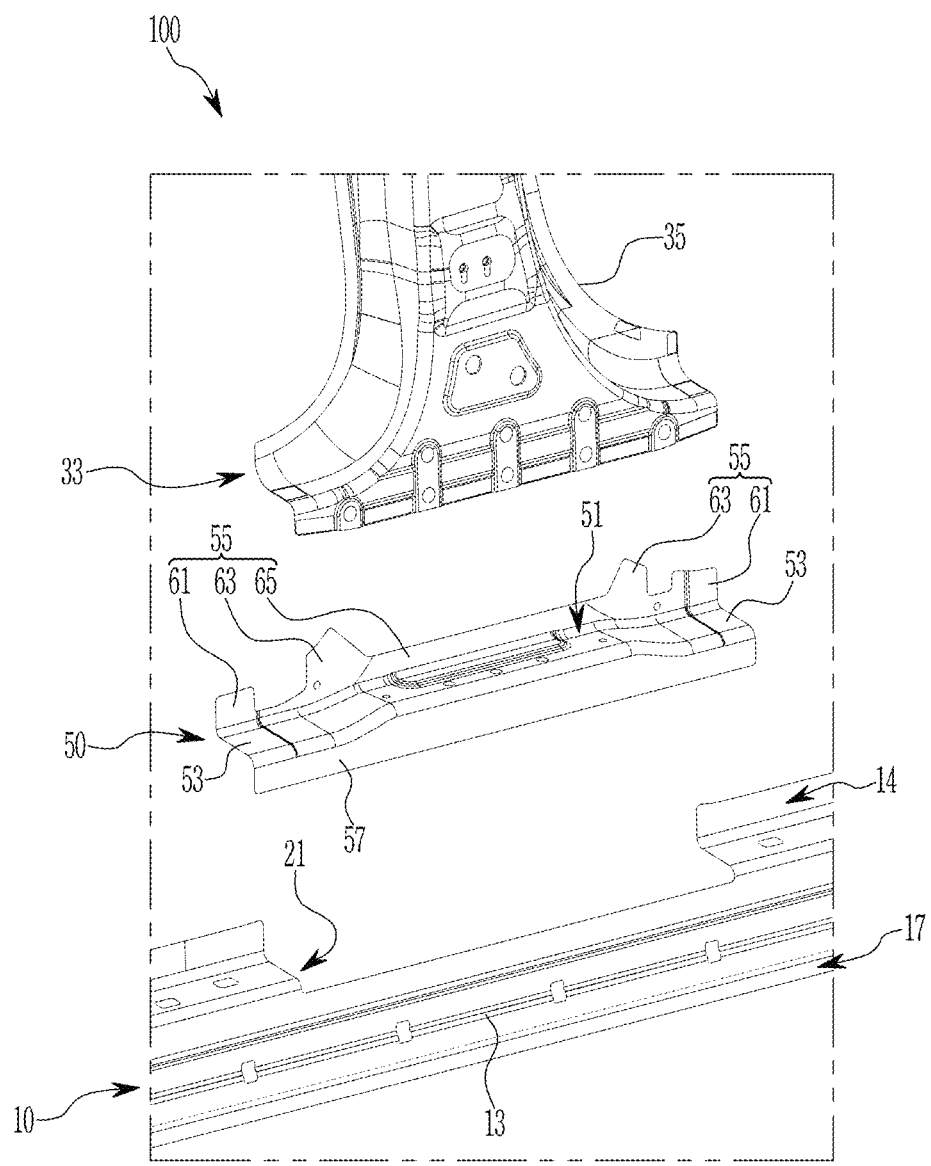
FIG. 5 illustrates an exploded perspective view of a vehicle side body structure according to an embodiment of the present disclosure.
Figure 6:
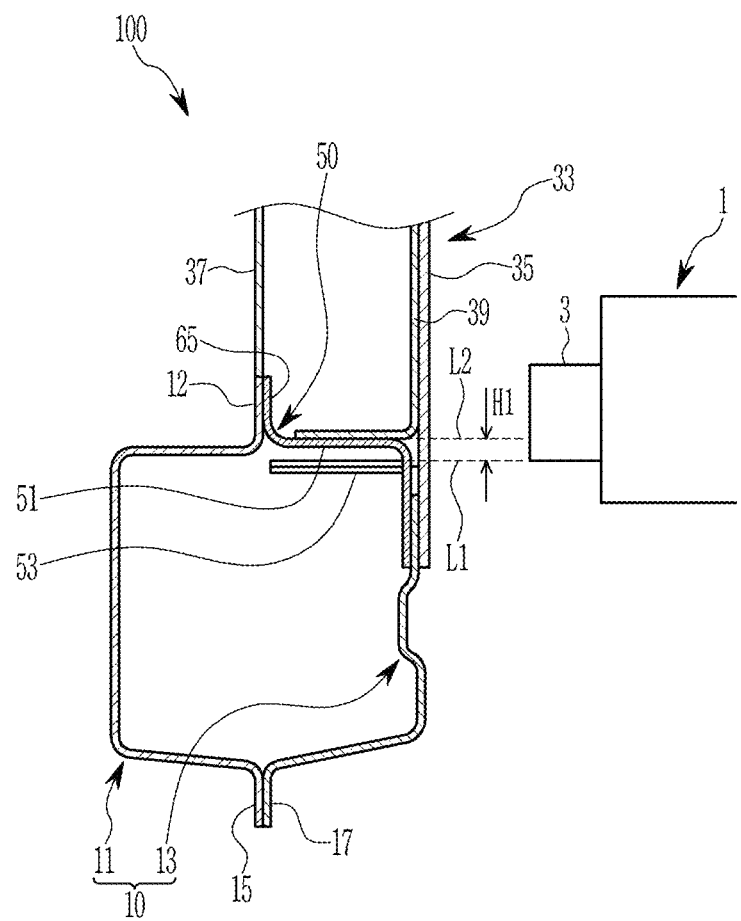
FIG. 6 illustrates a cross-sectional view taken along line A-A of the vehicle side body structure of FIG. 1 according to an embodiment of the present disclosure.
Figure 7:
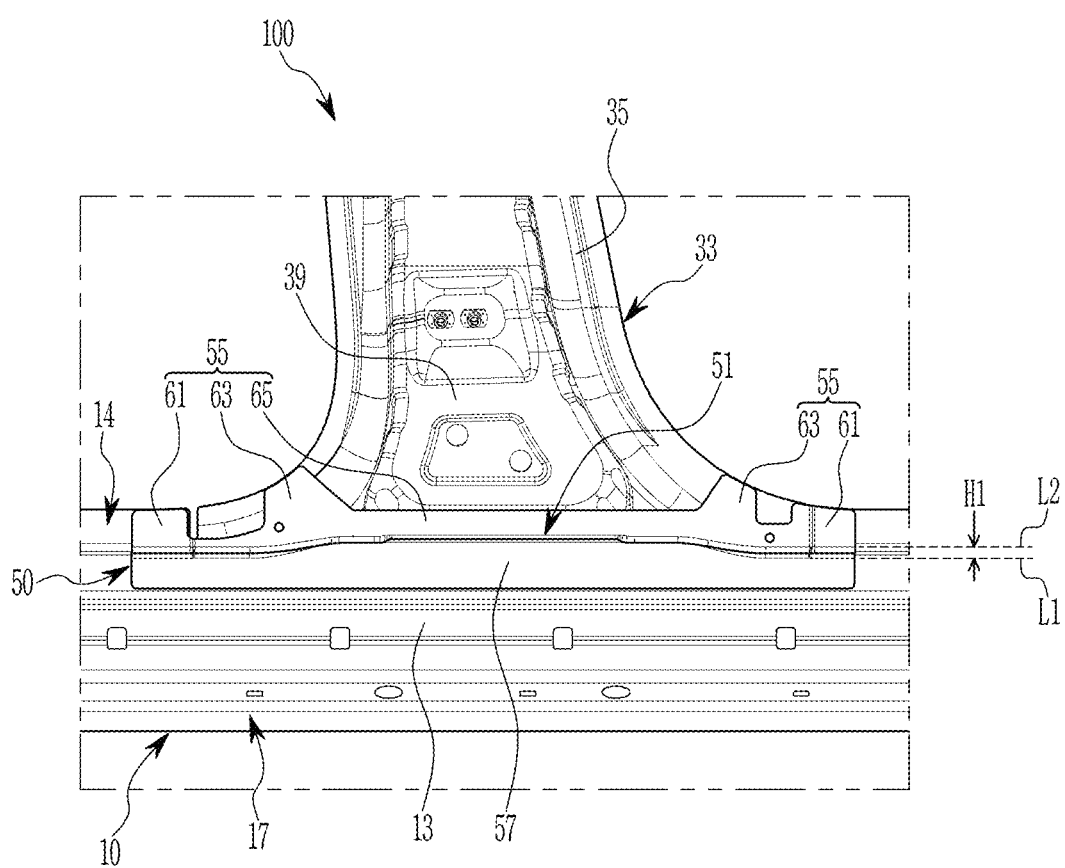
FIG. 7 illustrates a side view of a vehicle side body structure according to an embodiment of the present disclosure.

FIG. 5 illustrates an exploded perspective view of a vehicle side body structure 100 according to an embodiment of the present disclosure. FIG. 6 illustrates a cross-sectional view taken along line A-A of the vehicle side body structure 100 of FIG. 1 according to an embodiment of the present disclosure. FIG. 7 illustrates a side view of a vehicle side body structure 100 according to an embodiment of the present disclosure. FIG. 5 and FIG. 7 illustrate, for convenience of explanation, a vehicle side body structure 100 with respect to a sill outer member of a side sill.

Referring to FIGS. 1-7, the vehicle side body structure 100, according to an embodiment of the present disclosure, includes a side sill 10, a plurality of pillars 31 and 33, and a sill parting member 50.

In an embodiment of the present disclosure, the side sill 10 is provided at a lower portion of the vehicle side body structure 100, and is disposed along the vehicle body front-rear directions at both sides along the vehicle width direction. A follower panel (not shown) is bonded to the side sills 10 at both sides.

In the present specification, based on the vehicle width direction of the vehicle body, an inner area between the side sills 10 is referred to as 'inner,' and an outer area of the side sill 10 is referred to as 'outer.'

The side sill 10 includes a sill inner member 11 and a sill outer member 13 bonded to each other. The sill inner member 11 and the sill outer member 13 are bonded along the vehicle width direction through upper flanges 12 and 14 and lower flanges 15 and 17, respectively.

In an embodiment of the present disclosure, the plurality of pillars 31 and 33 are disposed along the vertical direction in the vehicle side body structure 100, and are connected to a roof structure (not shown) and the side sill 10.

The plurality of pillars 31 and 33 may include a front pillar 31, a center pillar 33, and a rear pillar (not shown) respectively disposed along the front-rear direction of the vehicle body.

In this example, lower portions of the plurality of pillars 31 and 33 are coupled to the side sill 10 and upper portions of the plurality of pillars 31 and 33 are coupled to the roof structure. In addition, the center pillar 33 may include a pillar outer member 35 and a pillar inner member 37 bonded to each other.

In an embodiment of the present disclosure, the sill parting member 50 is configured such that a height of the side sill 10 may be varied according to a vehicle model. The sill parting member 50 may be provided as a portion of the side sill 10 or as a separate product. The sill parting member 50 may be coupled to an upper portion of the side sill 10 and may be coupled to a lower portion of the pillar outer member 35 of the center pillar 33.

The sill parting member 50 may be press-molded in a shape set to allow a height of the side sill 10 to be variable according to the vehicle model. In one example, a material of the sill parting member 50 may be high-tensile steel or ultra-high-tensile steel known to those having ordinary skill in the art.

The sill parting member 50 may be coupled to a section portion 21 that is notched on the upper portion of the sill outer member 13 in the side sill 10. The section portion 21 may be defined as an area in which a portion of the upper portion of the sill outer member 13 is cut in a predetermined section along the front-rear direction of the vehicle body.

Figure 8:
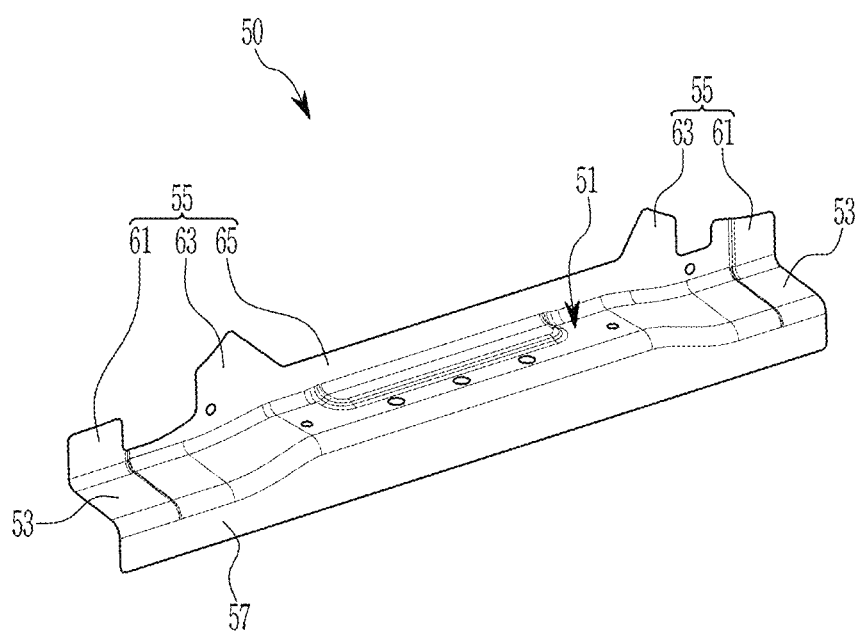
FIG. 8 illustrates a perspective view of a sill parting member applied to a vehicle side body structure according to an embodiment of the present disclosure.

FIG. 8 illustrates a perspective view of a sill parting member 50 applied to a vehicle side body structure 100 according to an embodiment of the present disclosure.

Referring to FIGS. 1-8, the sill parting member 50, according to an embodiment of the present disclosure, includes a protrusion portion 51, a flat portion 53, a first flange portion 55, and a second flange portion 57.

The protrusion portion 51 extends (e.g., protrudes) upward from the upper surface of the sill parting member 50 on a reference line L1 of the front-rear direction of the vehicle body along the upper surface of the side sill 10, i.e., the upper surface of the sill outer member 13.

The protrusion portion 51 may be formed to have a set height H1 at which the upper surface of the sill parting member 50 is positioned on an extension line L2 at a higher position than the reference line L1. Since the set height H1 of the protrusion portion 51 may vary depending on the vehicle model, the set height H1 is not limited to a specific value in the present specification (see FIG. 6 and FIG. 7).

Furthermore, in one example, the height of the protrusion portion 51 may be set to overlap a striking part (e.g., a striking portion) 3 of a barrier 1 for IIHS side collision evaluation. In addition, the upper surface of the protrusion portion 51 may be bonded (e.g., welded) to a lower portion of a pillar reinforcing member 39, which is coupled to an inner surface of the pillar outer member 35 of the center pillar 33.

The flat portions 53 extend along the front-rear direction of the vehicle body from both sides of the protrusion portion 51 to form a flat surface corresponding to the upper surface of the sill outer member 13. In other words, the flat portions 53 flatly extend in the front-rear direction of the vehicle body along the reference line L1 as described above from both sides of the protrusion portion 51.

The flat portions 53 at both sides may be bonded (e.g., welded) to the lower surface of the sill outer member 13 and the lower portion of the pillar outer member 35, with the protrusion portion 51 interposed therebetween through the section portion 21 of the sill outer member 13.

The first flange portion 55 is formed on the upper portion of the sill parting member 50 along the front-rear direction of the vehicle body. The first flange portion 55 extends upward from one edge of the sill parting member 50 along the vehicle width direction. The first flange portion 55 is bonded to the upper portion of the side sill 10 and the lower portion of the center pillar 33.

The first flange portion 55 includes a first bonding portion(s) 61 and a second bonding portion(s) 63. The first bonding portion(s) 61 is formed at the front and rear sides of the sill parting member 50 in the front-rear direction of the vehicle body, respectively. The first bonding portion(s) 61 is bonded (e.g., welded) to an upper flange 14 of the sill outer member 13 of the side sill 10.

In addition, the second bonding portions 63 are formed to be respectively spaced apart from the first bonding portions 61 between the first bonding portions 61 at the front and rear sides. The second bonding portions 63 are bonded (e.g., welded) to the lower portion of the pillar outer member 35 of the center pillar 33. In this example, the first bonding portions 61 and the second bonding portions 63 may be bonded to an upper flange 12 of the sill inner member 11.

In addition, the first flange portion 55 includes a third bonding portion 65 connected to the second bonding portions 63 between the second bonding portions 63 at the front and rear sides. The third bonding portion 65 is formed as the upper portion of the sill outer member 13, and may be bonded to the upper flange 12 of the sill inner member 11.

The second flange portion 57 is formed on the lower portion of the sill parting member 50 along the front-rear direction of the vehicle body. The second flange portion 57 extends downward from the other edge of the sill parting member 50 along the vehicle width direction. The second flange portion 57 is bonded (e.g., welded) to an inner surface of the sill outer member 13 of the side sill 10, i.e., a surface opposite to the upper surface of the sill outer member 13. In addition, the second flange portion 57 is bonded (e.g., welded) to the lower portion of the pillar outer member 35 of the center pillar 33.

Hereinafter, an assembly process and operation of the vehicle side body structure 100, according to an embodiment of the present disclosure and configured as described above, is described in detail with reference to FIGS. 1-8.

First, the sill parting member 50 is coupled to the section portion 21 that is notched on the upper portion of the sill outer member 13 of the side sill 10.

The sill parting member 50 is bonded to: the upper flange 14 of the sill outer member 13 through the first bonding portion 61 of the first flange portion 55; the lower surface of the sill outer member 13 through the flat portion 53; and the inner surface of the sill outer member 13 through the second flange portion 57. In this case, the third bonding portion 65 of the first flange portion 55 may be formed as the upper portion of the sill outer member 13.

In addition, the lower portion of the pillar outer member 35 of the center pillar 33 is bonded to: the second bonding portion 63 of the first flange portion 55; the flat portion 53 of the sill parting member 50; and the outer surface of the sill outer member 13. Further, the protrusion portion 51 of the sill parting member 50 is bonded to the lower portion of the pillar reinforcing member 39, which is coupled to the inner surface of the pillar outer member 35.

In this state, the upper flange 12 and the lower flange 15 of the sill inner member 11 of the side sill 10 are bonded to the upper flange 14 and the lower flange 17 of the sill outer member 13. In this case, the upper flange 12 of the sill inner member 11 is bonded to the first bonding portion 61 and the second bonding portion 63 of the first flange portion 55 of the sill parting member 50.

Then, the pillar inner member 37 of the center pillar 30 is bonded to the pillar outer member 35 and the upper flange 12 of the sill inner member 11 along the vehicle width direction.

The protrusion portion 51 of the sill parting member 50 extends to the set height H1 on the reference line L1 in the front-rear direction of the vehicle body on the upper surface of the sill outer member 13 to be positioned on the extension line L2 at a position that is higher than the reference line L1. The set height H1 of the protrusion portion 51 is varied depending on the vehicle model and is set to allow the height of the side sill 10 to extend upward. Furthermore, the height of the protrusion portion 51 may be set to overlap the striking part 3 of the barrier 1 for IIHS side collision evaluation.

Therefore, according to the vehicle side body structure 100, according to an embodiment of the present disclosure assembled as described above, the overlap cross-sectional section between the striking part 3 of the barrier 1 and the side sill 10 may be secured by the protrusion portion 51 of the sill parting member 50.

According to the vehicle side body structure 100, according to an embodiment of the present disclosure, in the IIHS side collision evaluation, the rotation due to the moment of the side sill 10 may be prevented through the sill parting member 50.

Figure 9A:
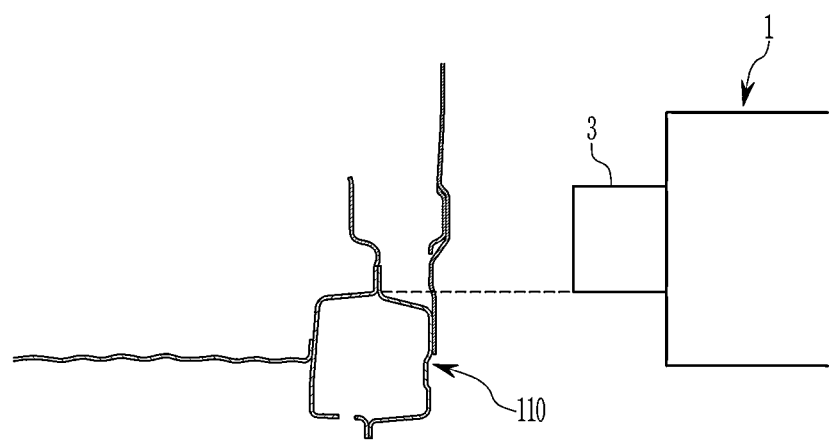
FIG. 9A and FIG. 9B schematically illustrate a comparative example of a vehicle side body structure according to an embodiment of the present disclosure.

On the other hand, in a comparative example in which the sill parting member 50 according to an embodiment of the present disclosure is not applied, as shown in FIG. 9A, the overlapping cross-sectional section between the striking part 3 of the barrier 1 and the side sill 110 is not secured.

Figure 9B:
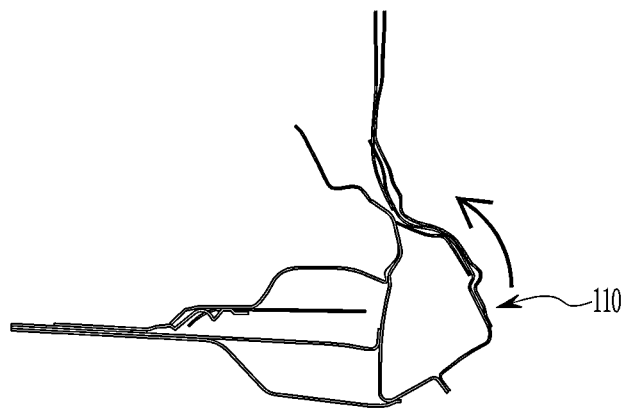

Accordingly, in the comparative example, during the IIHS side collision evaluation or the side collision of the vehicle, as shown in FIG. 9B, as the collision load is concentrated on the side sill 110, the side sill 110 rotates due to a moment, which may cause excessive deformation of the vehicle body and the aggravation of injuries to passengers.

According to the vehicle side body structure 100, according to an embodiment of the present disclosure as described so far, it is possible to respond to the more strengthened IIHS side collision evaluation while securing the rigidity and strength between the side sill 10 and the center pillar 33 by the sill parting member 50.

In addition, since the vehicle side body structure 100, according to an embodiment of the present disclosure, may prevent rotation of the side sill 10 during the side collision of the vehicle, it is possible to secure the collision safety performance through minimizing deformation of the vehicle body and securing the survival space for passengers.

Furthermore, according to the vehicle side body structure 100, according to an embodiment of the present disclosure, since mounting of various reinforcing members for securing the overlapping cross-sectional section between the striking part 3 of the barrier 1 and the side sill 10 may be minimized, the weight and manufacturing cost of the vehicle body may be reduced.

While this disclosure has been described in connection with what is presently considered to be practical embodiments, it is to be understood that the disclosure is not limited to the disclosed embodiments. However, on the contrary, the disclosure is intended to cover various modifications and equivalent arrangements included within the spirit and scope of the appended claims.

DESCRIPTION OF SYMBOLS

| | |
|---|---|
| 1: barrier | 3: striking part |
| 10: side sill | 11: sill inner member |
| 12, 14: upper flange | 13: sill outer member |
| 15, 17: lower flange | 21: section portion |
| 31: front pillar | 33: center pillar |
| 35: pillar outer member | 37: pillar inner member |
| 39: pillar reinforcing member | 50: sill parting member |
| 51: protrusion portion | 53: flat portion |
| 55: first flange portion | 57: second flange portion |
| 61: first bonding portion | 63: second bonding portion |
| 65: third bonding portion | H1: height |
| L1: reference line | L2: extension line |
| 100: vehicle side body structure | |

What is claimed is:

1. A vehicle side body structure comprising:
a side sill disposed along a front-rear direction of a vehicle body; and
a separate sill parting member coupled to an upper portion of the side sill,
wherein the sill parting member includes a protrusion portion extending upward from an upper surface of the side sill and along the front-rear direction of the vehicle body, and
wherein the sill parting member includes flat portions that respectively extend from both sides of the protrusion portion along the front-rear direction of the vehicle body and are bonded to a lower surface of the side sill.

2. The vehicle side body structure of claim 1, wherein the sill parting member is coupled to a lower portion of a center pillar disposed in a vertical direction.

3. The vehicle side body structure of claim 1, wherein a height of the protrusion portion is set to overlap a striking portion of a barrier for side collision evaluation.

4. The vehicle side body structure of claim 1, wherein the sill parting member is coupled to a section portion that is notched on an upper portion of the side sill.

5. The vehicle side body structure of claim 1, wherein the side sill includes a sill inner member and a sill outer member bonded to each other, and
wherein the sill parting member is coupled to an upper portion of the sill outer member, and is coupled to a lower portion of a pillar outer member of a center pillar.

6. The vehicle side body structure of claim 1, wherein the sill parting member includes a first flange portion extending upwardly from one edge along a vehicle width direction, and a second flange portion extending downwardly from another edge.

7. The vehicle side body structure of claim 6, wherein the first flange portion includes a first bonding portion bonded to an upper portion of the side sill and a second bonding portion bonded to a lower portion of the center pillar.

8. The vehicle side body structure of claim 6, wherein the second flange portion is bonded to an inner surface of the side sill.

9. The vehicle side body structure of claim 1, wherein the protrusion portion is bonded to a pillar reinforcing member coupled to an inner surface of the center pillar.

* * * * *